Jan. 9, 1945.  A. A. JORGENSON  2,367,128
NAVIGATION INSTRUMENT
Filed Dec. 2, 1942   3 Sheets-Sheet 1

Inventor
Alf. A. Jorgenson
By Ritter, Machlin & Muir
His Attorneys

Jan. 9, 1945. A. A. JORGENSON 2,367,128
NAVIGATION INSTRUMENT
Filed Dec. 2, 1942 3 Sheets-Sheet 2

Inventor
Alf A. Jorgenson
By Ritter, Mechlin & Muir
his Attorneys

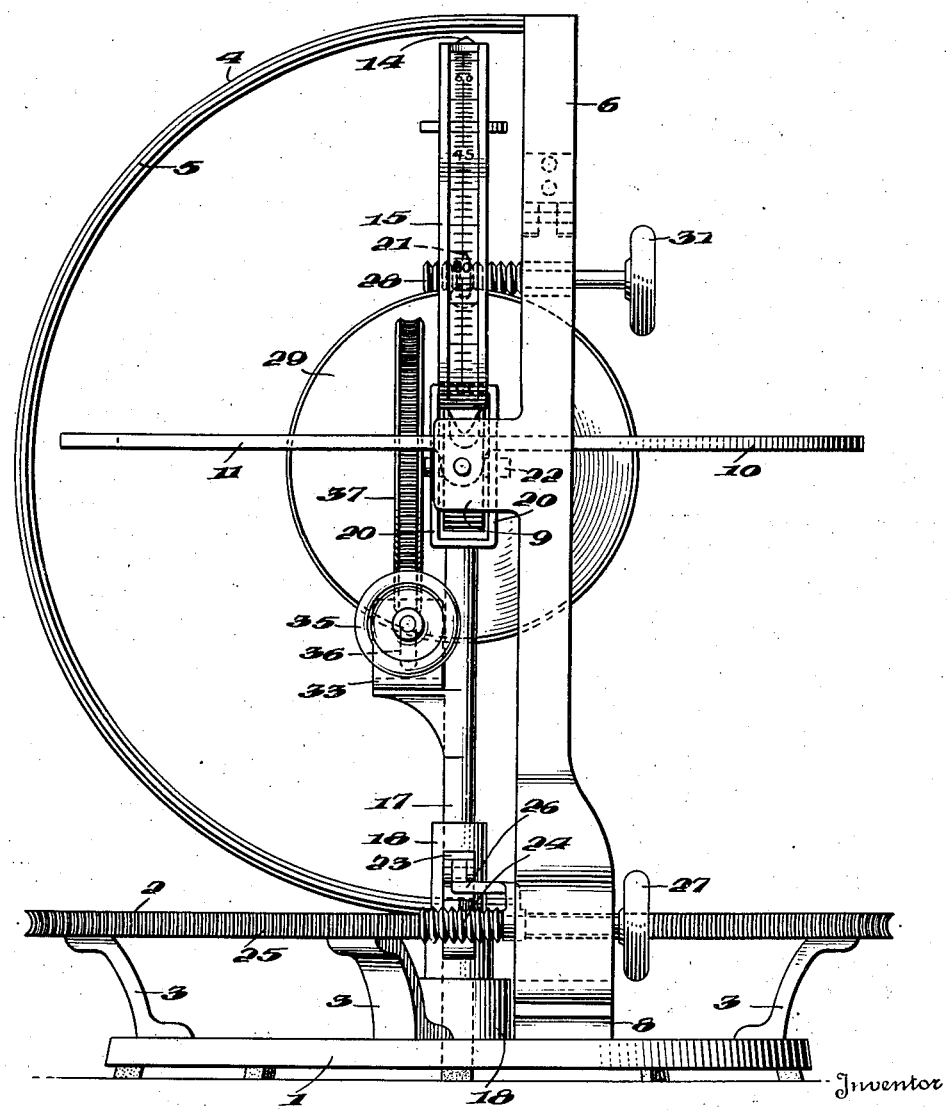

Patented Jan. 9, 1945

2,367,128

UNITED STATES PATENT OFFICE 2,367,128

NAVIGATION INSTRUMENT

Alf A. Jorgenson, San Diego, Calif.

Application December 2, 1942, Serial No. 467,631

13 Claims. (Cl. 33—1)

My invention relates to instruments for use in solving problems arising in navigation by graphically representing the motion of celestial bodies across one-half of that part of the sky which is visible to an observer. Its principal object is to speed up the process of calculating a position and at the same time to decrease the possibility of error as much as possible by reducing the number of manipulations to a minimum.

By my invention, it is possible to establish the latitude and longitude of an observer when the altitude, declination and azimuth of a celestial body are known. The invention also enables the establishment of the initial course and distance for great circle sailings provided the distance is less than six thousand miles. Moreover, it enables the distance and direction of a line of position to be accurately determined and it will also indicate instantly and automatically the azimuth of any celestial body once its altitude has been determined from setting up the body's declination against an assumed position.

The invention consists primarily of a set of scales and circles, together with their indicators or indexes, to represent the half of a terrestrial sphere projected to the limits of the celestial sphere, where the observer's horizon is represented by a circle on which is inscribed an azimuth scale. The observer's zenith is represented by means called a latitude indicator or pointer, the observer's meridian is represented by a line which joins the poles and is inscribed on a scale called the latitude-declination scale, and both the celestial and terrestrial poles are represented by the top and bottom points of the instrument.

The celestial body is represented by means called an altitude indicator or pointer which is mounted for universal movement about a point at the exact center of the represented sphere. This indicator is mounted on a rotatable shaft which is provided outside of the sphere proper with an arm for indicating the hour angle on a graduated scale inscribed on a circle which is normal to the axis of the shaft.

One of the principal features of the invention consists in rotatably mounting the altitude scale on an axis coincident with the latitude indicator so that the altitude scale will indicate zenith distance, altitude, and azimuth simultaneously.

Another feature of the invention consists in rotatably mounting the horizon circle, on which the azimuth scale is inscribed, so as to simulate graphically the observer's horizon.

A further feature of the invention consists in providing the horizon circle with a relatively immovable latitude indicator which will always be in the observer's zenith so that regardless of the latitude it indicates the horizon circle will always represent the observer's true horizon.

A still further feature of the invention consists in providing the instrument with a transparent latitude-declination scale and a transparent altitude scale, whereby indicators or pointers for cooperating with the scale may be mounted inside of the scales and be viewed from the outside.

Other and more specific features of the invention, residing in advantageous forms, combinations and relations of parts, will hereinafter appear and be pointed out in the claims.

In the drawings, illustrating a preferred embodiment of the invention,

Figure 3 is a side elevational view of the instrument.

Figure 1:
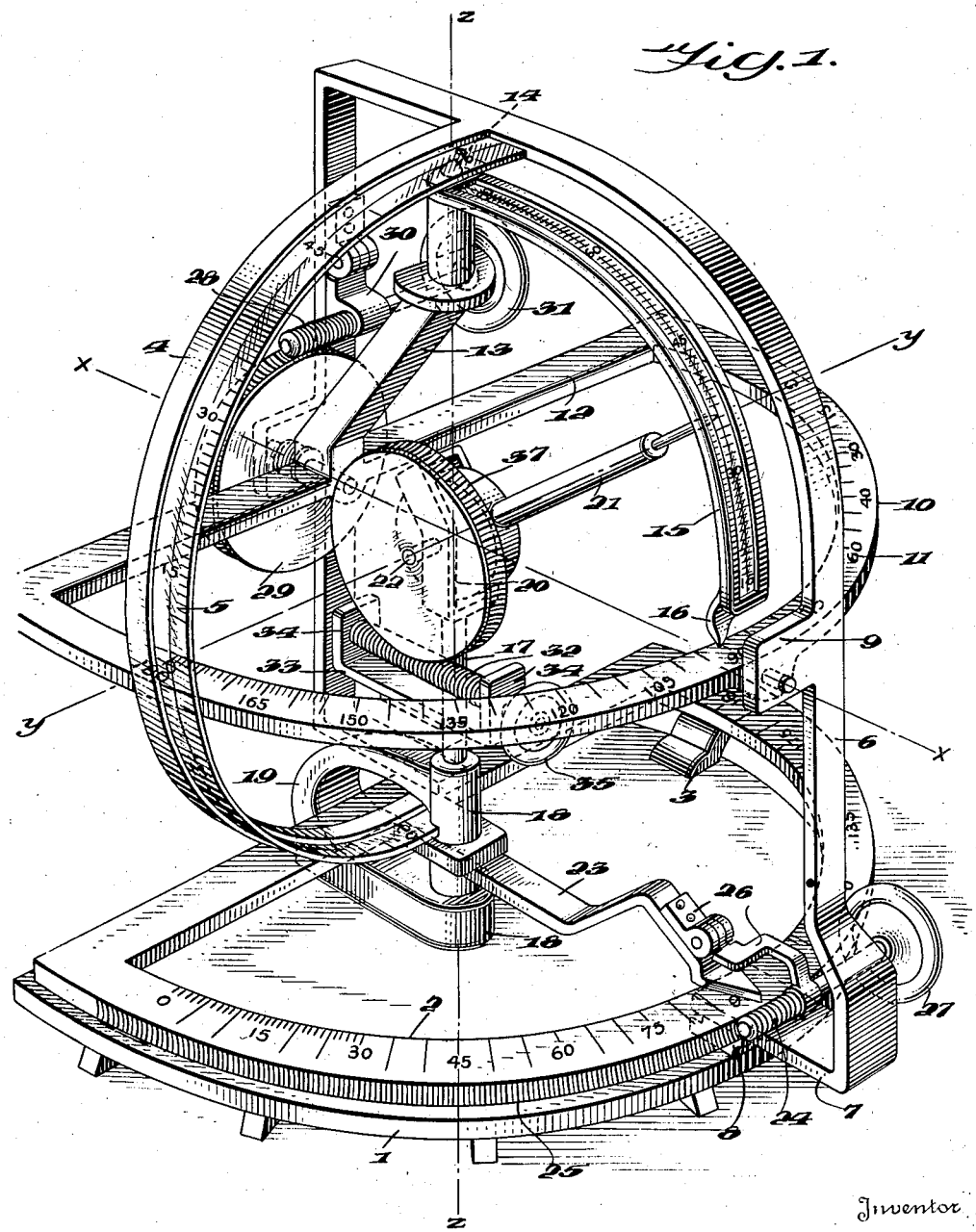
Figure 1 is a perspective view of the instrument.
Figure 2:
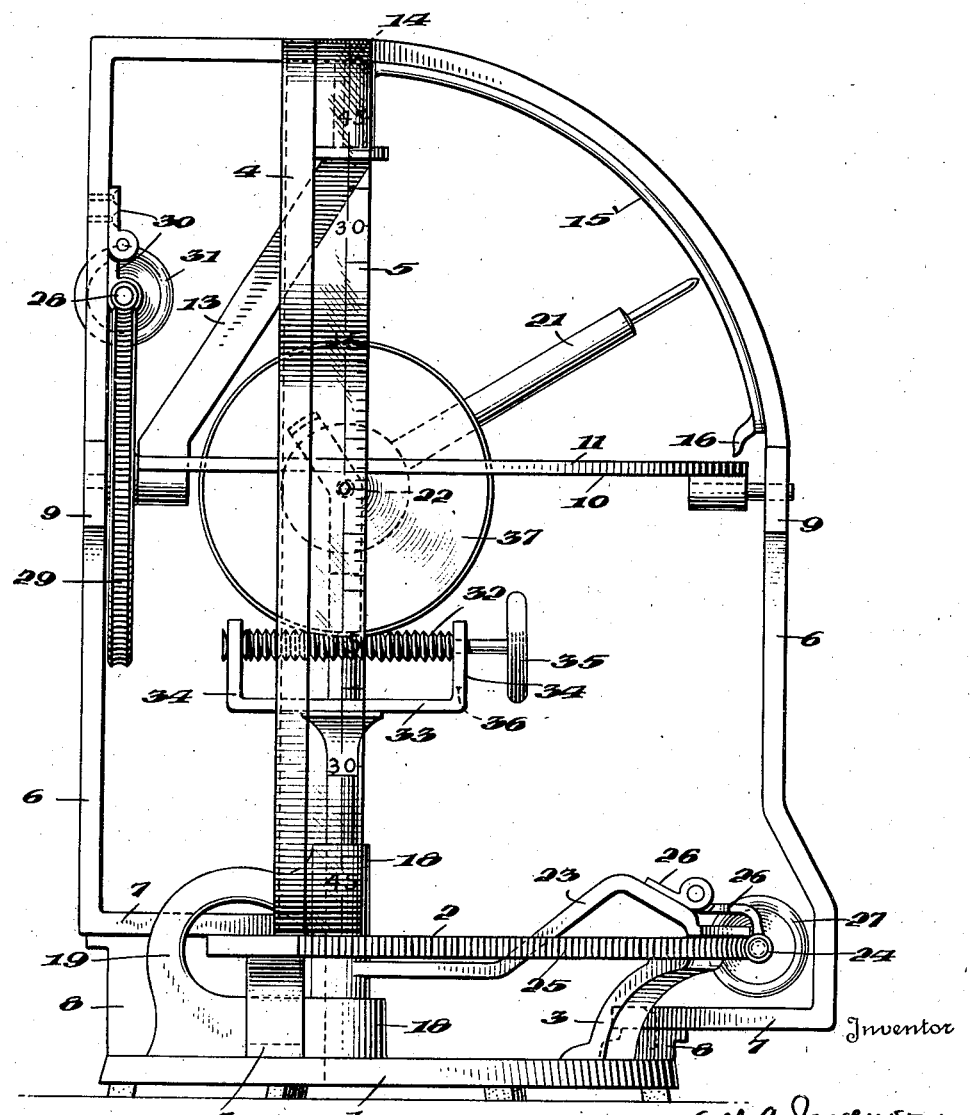
Figure 2 is a front elevational view of the instrument.

Referring more particularly to the drawings, I indicates the base of the instrument which may, of course, take any convenient form or shape. Mounted on the base is a plate member 2 having a circular series of graduations constituting an hour angle scale or arc. The plate member may be rigidly connected to the base in any suitable manner, such as by supports or the like 3. The hour angle scale is graduated with the zero point at the front of the instrument and the 180° point at the rear.

Extending upwardly from the base at right angles to the hour angle scale 2 is an arcuate member 4 having a latitude-declination scale inscribed on a transparent portion 5. The lower end of the arcuate member 4 is rigidly connected to the plate member 2 and its upper end is rigid with a frame 6 of substantially inverted U-shape which has inturned flanges 7 at its lower portion rigidly connected by filler blocks 8 to the base 1.

The latitude-declination scale is marked in degrees and minutes with the zero degree point midway between its ends which corresponds to the equator and with the 90° points at each pole. This scale is bisected by a longitudinally extending line representing the meridian of the observer.

Rotatably mounted in lateral extensions 9 of the frame 6 is a plate-like member 10 which is adapted to represent the horizon of an observer.

This plate-like member preferably has an arcuate portion 11 of slightly more than 180° in extent which may be conveniently connected by a relatively straight portion 12. The axis of rotation of the horizon indicating means, represented by the dot and dash line $x$—$x$, is perpendicular to the plane of the arcuate line on the latitude-declination scale representing the meridian.

Inscribed on the upper surface of the arcuate portion 11 of the horizon indicating means is an azimuth scale graduated from zero to 180° with the zero point at the rear of the instrument and the 180° point in front directly above the zero point on the hour angle scale. The azimuth and the hour angle scale are so related to each other that lines connecting the zero and 180° points on the respective scales will lie in the same plane.

Extending upwardly and inwardly from the straight portion 12 of the horizon indicating means is a rigid arm 13, the outer end of which is so arranged as to represent the observer's zenith and constitutes a latitude pointer or indicator 14 which is movable in the plane of the meridian arc inscribed on the latitude-declination scale. The outer end portion of the arm 13 is so formed as to provide a pivot for the upper end of an arcuate altitude scale 15. The axis of this pivot intersects the center of the sphere regardless of whatever value of latitude the latitude pointer may be indicating.

The altitude scale is in effect a quadrant with one end pivoted on the end of the latitude indicator and the other end movable along the horizon circle, it being provided at the latter end with an indicator or pointer 16 for cooperating with the azimuth scale. The graduations on the altitude scale, like those on the latitude-declination scale, are on transparent material and they are bisected by a longitudinal line which lies in the same plane as the axis of rotation of the scale. The graduations are arranged so that the 90° point would be directly in the center of the latitude indicator and the zero point at the observer's horizon. The upper and lower extremes of this scale are missing however due to structural considerations, but it will be recognized that the elimination of as much as ten degrees at each end of the scale will in no way impair the usefulness of the instrument for navigational purposes.

Extending upwardly from the base 1 at the center of the circular series of graduations on the hour angle scale 2 is a shaft 17 which is rotatably mounted in vertically spaced bearings 18 rigidly carried by a yoke member 19 which is secured in any suitable manner to the base. The axis of rotation of the shaft, represented by the dot and dash line $z$—$z$, lies in the plane of the arcuate meridian line on the latitude-declination scale and intersects the axis of rotation $x$—$x$ of the horizon indicating means 10 at the center of the sphere. The upper end of shaft 17 is provided with laterally spaced arms 20 between which a declination-altitude indicator or pointer 21 is rotatably mounted on a pin or the like 22. The axis of rotation of this indicator, represented by the dot and dash line $y$—$y$, is perpendicular to the axis of rotation $z$—$z$ of the shaft 17 and it intersects the axis of rotation $x$—$x$ of the horizon indicating means at the same point at which that axis intersects axis $z$—$z$. It is thus to be seen that the declination-altitude indicator is mounted for universal movement at a point coincident with the spherical center of the instrument.

Connected to the lower end of the shaft 17 so as to be movable therewith is an hour angle indicator 23, the outer end of which is adapted to traverse the hour angle scale. As this indicator is connected to the shaft so as to be movable therewith, movement thereof, for a predetermined angular distance, will result in movement of the declination-altitude indicator a corresponding angular distance in the same direction.

To obtain very accurate settings and readings, the instrument is preferably provided with several micrometer adjustments. Thus the outer end of the hour angle indicator 23 is provided with a worm screw 24 adapted to cooperate with worm gear teeth 25 formed on the periphery of the hour angle scale. The worm screw is hingedly mounted on the hour angle indicator by a pair of hinge plates 26 so that it may be moved to and from operative cooperation with the gear teeth. A suitable knob 27 is provided whereby the screw may be conveniently rotated when in engagement with the teeth.

A micrometer adjustment is also provided for the horizon indicating means and it comprises a worm screw 28 for cooperating with worm gear teeth formed on the periphery of a wheel or disk 29 which is rigidly connected to the horizon indicating means. The worm screw 28 is hinged by plates 30 to the frame of the instrument for swinging movement into and out of cooperative relationship with the gear teeth; and a suitable knob 31 is provided whereby the worm screw may be easily rotated.

The micrometer adjustment is also provided for rotating the declination-altitude indicator about its $y$—$y$ axis, the worm screw 24 and gear teeth 25 serving, of course, to obtain a close adjustment of that indicator about its $z$—$z$ axis. This means for obtaining a micrometer adjustment of the indicator about the $y$—$y$ axis includes a worm screw 32 which is mounted in a bracket 33 rigidly connected to shaft 17. One end of the screw is rotatably journaled in one of the upstanding legs 34 of the bracket 33, while the other end of the screw which is provided with an operating knob 35 is vertically movable within a slot 36 formed in the other upstanding leg of the bracket. In this way, the worm screw is movable vertically into and out of operative engagement with worm gear teeth formed on the periphery of a wheel or disk 37 connected with the declination-altitude indicator so as to move therewith about the $y$—$y$ axis. Means other than the micrometer adjustments described will readily occur to those skilled in the art which can be quickly released so that the indicators or pointers with which they cooperate may be swung rapidly and freely through their arcs, and it is to be understood that the invention is not limited to the particular means which have been illustrated and described for obtaining the close adjustments.

In determining the observer's position on the terrestrial sphere by the instrument herein described, the following procedure may be followed where equipment is available for accurately determining the azimuth of a celestial body: Simultaneous sights of the altitude and azimuth of any celestial body are first taken. The declination of the body is then obtained from a nautical almanac and set up on the instrument in either north or south latitude, as the case may be, by having the declination-altitude indicator 21 point to the exact declination on the latitude-declination scale 5. With the declination-altitude indicator thus set up in line with the meridian line on the latitude-declination scale, the hour angle pointer is set exactly at zero on the hour scale.

The next step is to move the hour angle indicator 23 to approximately the local hour angle of the celestial body and then the latitude indicator 14 is moved to a point on the latitude-declination scale representing the approximate latitude of the observer. Moving the hour angle indicator causes the declination-altitude indicator 21 to move in the same direction an equal number of angular degrees since, as has been pointed out, these two indicators are rigidly connected. The altitude scale 15 is now moved to set the azimuth indicator 16 which is rigid therewith to the exact observed azimuth of the celestial body. With the altitude and azimuth fixed, it is plain that only one value of latitude and one value of hour angle will satisfy the condition of bringing the observed altitude on the altitude scale to exactly coincide with the declination-altitude indicator. The longitudinal line on the altitude scale and the lateral line indicating the observed altitude is the intersection on the altitude scale with which the declination-altitude indicator must exactly coincide. To make this value of altitude coincide with the indicator, it is only necessary to turn the hour angle worm screw 24 with one hand while turning the horizon worm screw 28 with the other until the indicator points to the observed altitude on the altitude scale. The latitude of the observer is then read directly off the instrument, it being the value on the latitude-declination scale to which the latitude indicator points; and longitude is obtained by adding or subtracting, as may be necessary, the local hour angle, as indicated by the hour angle indicator, from the Greenwich hour angle of the celestial object for the instant of observation. The Greenwich hour angle is, of course, taken from the same nautical almanac as the declination of the celestial body. After having observed the altitude and azimuth and gotten the necessary declination and Greenwich hour angle from the nautical almanac, the actual manipulation and reading of the instrument should take no longer than ten or fifteen seconds by any practiced navigator.

In cases where the azimuth is not known and cannot be observed, the following procedure may be followed: After observing the altitude of a celestial body, its declination is taken from the nautical almanac and set up on the instrument as in the preceding example. The observer's estimated longitude is then set up on the hour angle scale in values of local hour angle of the celestial body's Greenwich hour angle at the instant of observation. In setting the local hour angle, the declination-altitude indicator swings around with the hour angle indicator an equal number of angular degrees. The observer's estimated latitude is then set up on the instrument by setting the latitude indicator 14 to the estimated latitude on the latitude-declination scale 5. After this the altitude scale 15 is rotated until the longitudinal line thereon is exactly over the declination-altitude indicator. The azimuth indicator 16 on the end of the altitude scale will then indicate the azimuth of the body and the altitude read under the declination-altitude indicator will be the calculated altitude of the assumed or estimated position. The difference between the observed and calculated altitudes will then be the angular distance between the assumed place and the actual place of observation, in accordance with well known laws of navigation. If the difference is of the order of only a few minutes, each minute can be taken to equal one nautical mile. As is well known to navigators, the indicated azimuth will indicate the direction in which the line of position lies. No more than a few seconds should be required by a practiced navigator to determine the distance and direction of this line of position after the declination and hour angle have been obtained from the nautical almanac.

In determining the course and distance for great circle sailings, the declination-altitude indicator is first set to the latitude of destination. The hour angle indicator is then set to the difference of longitude between the place of destination and the place of departure. Setting the hour angle indicator will move the declination-altitude indicator an equal angular distance. The latitude indicator 14 is then set to the latitude of departure. Thereafter the altitude scale is moved to coincide with the declination-altitude indicator. The altitude indicated on the altitude scale subtracted from 90° will then be the angular distance and the azimuth corrected to the proper quadrant will be the true course of departure.

A still further use to which the instrument may be put, as those skilled in the art will readily appreciate, is that of a star finder. This can be accomplished by setting the altitude indicator 21 to the star's declination on the declination scale 5. The local hour angle of the star, as computed from data obtained from the nautical almanac, is then set up on the hour angle scale 2. Movement of the hour angle indicator 23 to the proper position on the hour angle scale results in the altitude indicator 21 moving a corresponding number of degrees. The altitude scale 15 is then moved around so that it coincides with the altitude indicator. The altitude thus indicated on the altitude scale by the altitude indicator is that of the star sought and the azimuth which is indicated on the azimuth scale 11 by the azimuth indicator 16 is that of the azimuth of the star sought. With this information the star can be easily found since only its altitude and azimuth are necessary to disclose it.

The instrument as described herein represents only one-half of an observer's visible sky in order to reduce its size and since no more than this is necessary for solving navigation problems. However, it will be obvious to those skilled in the art that the instrument could be easily made to represent the entire visible sky.

It is to be noted that the pivots or bearings which support the horizon indicating means 10 are offset from the supporting frame 6 of the instrument to allow the altitude scale to pass freely under the frame when the azimuth index is indicating an azimuth of less than 90° with respect to the North Pole. Moreover, the horizon indicating means 10 is disposed sufficiently above its axis of rotation to permit the latitude indicator to be swung to zero degrees of latitude without hitting the shaft 17 or its bearings 18. Lifting the horizon circle this amount will eliminate approximately five degrees of altitude near the horizon, but this will in no way impair the use of the instrument, since no altitudes of celestial bodies that low are ever used for navigational purposes.

Various changes and modifications in structural details of the particular embodiment of the instrument herein described and illustrated to incorporate features well known to the instrument marker's art may, of course, be made without departing from the spirit and scope of the invention as defined in the appended claims, the present embodiment being merely an exemplification of one advantageous form the invention can assume.

What I claim is:

1. A navigation instrument involving an hour angle arc, a latitude-declination arc rigid with the hour angle arc, horizon indicating means pivotally mounted on an axis normal to the plane of the latitude-declination arc, an indicator rigid with said horizon indicating means cooperable with the latitude-declination arc to indicate the observer's latitude, an altitude arc pivotally connected to and movable with said horizon indicating means for rotation about an axis at right angles to said horizon indicating means, a declination-altitude indicator mounted for universal movement about a point on the axis of said horizon means adapted to be moved successively into and out of cooperation with the latitude-declination arc and the altitude arc, and an hour angle indicator connected to said declination-altitude indicator and movable therewith about one of its axes.

2. A navigation instrument involving an arcuate hour angle scale, an arcuate latitude-declination scale at right angles to the hour angle scale, horizon indicating means rotatable about an axis normal to the plane of the arc of the latitude-declination scale, said horizon indicating means being provided with a latitude indicator and with an azimuth scale, an altitude scale movably mounted on said horizon indicating means, an arm movable about intersecting axes adapted to successively cooperate with said latitude-declination scale and said altitude scale, and an hour angle indicator adapted to move said arm about one of its axes from a position where it cooperates with said latitude-declination scale to a position where it will cooperate with the altitude scale.

3. A navigation instrument involving an arcuate latitude-declination scale, horizon indicating means rotatable about an axis normal to the plane of the arc of said latitude-declination scale, an arcuate altitude scale rotatably mounted on said horizon indicating means for swinging movement about an axis normal to the plane of said means, said horizon indicating means having an azimuth scale and said altitude scale having a portion constituting an indicator for cooperating with the azimuth scale, a declination-altitude indicator rotatably mounted about two intersecting axes which intersect the axis of rotation of the horizon indicating means at the same point, an hour angle indicator for moving said declination-altitude indicator from cooperation with the latitude-declination scale to a position where it will cooperate with the altitude scale, and means carried by said horizon indicating means for coacting with the latitude-declination scale for indicating latitude after the horizon indicating means and the hour angle indicator have been adjusted to bring the declination-altitude indicator into the desired position on the altitude scale.

4. A navigation instrument involving a fixed arcuate latitude-declination scale, horizon indicating means pivotally mounted on an axis normal to the plane of the arc of the latitude-declination scale, an arcuate altitude scale perpendicular to the horizon indicating means and rotatably mounted thereon for swinging movement about an axis which intersects its axis of rotation, a declination-altitude indicator mounted inside of said arcuate scales movable about perpendicular axes which intersect the axis of rotation of the horizon means for selectively cooperating with said latitude-declination scale and said altitude scale, an hour angle indicator adapted to move the declination-altitude indicator about one of its axes, and latitude indicating means rigidly mounted on said horizon indicating means for cooperating with said latitude-declination scale to indicate the observer's latitude.

5. A navigation instrument involving a single scale on which latitude and declination may be indicated, horizon indicating means pivotally mounted on an axis perpendicular to the plane of the arc of the latitude-declination scale, an arcuate altitude scale rotatably mounted on said horizon indicating means, the axis of rotation of the altitude scale being perpendicular to the horizon means and passing through the axis of rotation thereof, a latitude indicator rigid with said horizon indicating means and coincident with the axis of rotation of the altitude scale for cooperating with the latitude-declination scale to indicate the observer's latitude and a universally mounted declination-altitude indicator adapted to be moved successively into and out of cooperation with the latitude-declination scale and with the altitude scale.

6. A navigation instrument involving an arcuate latitude-declination scale, rotatable means representing the horizon of an observer, said means being rotatable about an axis at right angles to the plane of the arc of the latitude-declination scale, means rigid with said rotatable means and located with respect thereto as to correspond to the observer's zenith, said rigid means being cooperable with the latitude-declination scale to indicate the latitude of the observer an arcuate altitude scale mounted on said rotatable means to swing about an axis passing through said zenith and perpendicular to the horizon, and a universally mounted declination-altitude indicator adapted to be moved successively into and out of cooperation with the latitude-declination scale and with the altitude scale.

7. A navigation instrument involving an arcuate latitude-declination scale, rotatable means representing the horizon of an observer, said means being rotatable about an axis at right angles to the plane of the arc of the latitude-declination scale, means rigid with said rotatable means having a portion located in respect thereto as to correspond to the observer's zenith, said portion being cooperable with the latitude-declination scale to indicate the observer's latitude, an arcuate altitude scale perpendicular to the horizon represented by said rotatable means and pivotally mounted on said latitude indicating member, and universally movable means adapted to be moved successively into and out of cooperation with said latitude-declination scale and with said altitude scale.

8. A navigation instrument involving an arcuate latitude-declination scale, means representing the horizon of an observer rotatable about an axis at right angles to the plane of the arc of the latitude-declination scale, an azimuth scale mounted on said horizon means, means rigid with said horizon means having a portion mounted thereon so as to correspond to the observer's zenith, said portion being cooperable with the latitude-declination scale to indicate the observer's latitude, an arcuate altitude scale rotatably mounted adjacent one end on the latitude indicating member for swinging movement about an axis which is perpendicular to the horizon means and passes through said zenith, one end of the altitude scale being free and having means constituting an azimuth indicator, and a universally mounted declination-altitude indicator adapted to be moved successively into and out of cooperation with the latitude-declination scale and with the altitude scale.

9. A navigation instrument involving a latitude-declination scale, rotatable means representing the horizon of an observer, means rigid with said rotatable means having a portion located with respect thereto as to correspond to the observer's zenith, said portion being cooperable with the latitude-declination scale to indicate the observer's latitude, an arcuate azimuth scale on said rotatable means, an altitude scale rotatably mounted on said rotatable means so as to swing about an axis passing through said zenith and perpendicular to the horizon, said altitude scale having a portion constituting an azimuth indicator which is movable along the azimuth scale when the altitude scale is moved about its axis, and a universally mounted declination-altitude indicator adapted to be moved successively into and out of cooperation with said latitude-declination scale and with said altitude scale.

10. A navigation instrument involving an arcuate latitude-declination scale, horizon indicating means rotatable about an axis perpendicular to the arc of the latitude-declination scale, an arcuate altitude scale concentric with the arc of the latitude-declination scale and rotatably mounted on the horizon means to swing about an axis perpendicular thereto, a universally mounted declination-altitude indicator adapted to be moved successively into and out of cooperation with the latitude-declination scale and with the altitude scale, and a latitude indicator rigid with said horizon indicating means and movable therewith in the plane of the arc of the latitude-declination scale for indicating the latitude of the observer.

11. A navigation instrument involving an arcuate latitude-declination scale, horizon indicating means rotatable about an axis perpendicular to the arc of the latitude-declination scale, said means having a rigid portion movable along said scale an arcuate altitude scale concentric with the arcuate latitude-declination scale and rotatably mounted on said horizon means, the axis of rotation of the altitude scale being perpendicular to the horizon means and intersecting its axis of rotation, and a declination-altitude indicator selectively movable about perpendicular axes which intersect the axis of rotation of said horizon means at the same point for successively cooperating with said latitude-declination scale and with the altitude scale.

12. A navigation instrument involving an arcuate transparent latitude-declination scale, horizon indicating means rotatably mounted about an axis perpendicular to the arc of the latitude-declination scale, a transparent altitude scale rotatably mounted on said horizon indicating means, the axis of rotation of said altitude scale being perpendicular to the horizon indicating means and intersecting its axis of rotation, a declination-altitude indicator mounted for universal movement about the point of intersection of the axes of rotation of the horizon indicating means and of the altitude scale, said declination-altitude indicator being adapted to be selectively viewed through the latitude-declination scale and the altitude scale, and a latitude indicator rigidly mounted on said horizon means and adapted to be viewed through the transparent latitude-declination scale.

13. A navigation instrument involving an hour angle arc, an hour angle indicator rotatable about an axis perpendicular to the hour angle arc and passing through the center thereof, horizon indicating means rotatable about an axis which is perpendicular to and intersects the axis of the hour angle indicator, a latitude-declination arc rigid with respect to the hour angle arc and disposed in a plane at right angles to the axis of rotation of the horizon indicating means, an altitude arc concentric with the latitude-declination arc and rotatably mounted on the horizon indicating means so as to swing about an axis which is perpendicular thereto and intersects its axis of rotation at the point of intersection of the hour angle axis therewith, and a declination-altitude indicator for successively cooperating with said latitude-declination arc and with the altitude arc, said declination-altitude indicator being rotatable about an axis coincident with the hour angle axis and also about an axis parallel to the plane of the hour angle arc.

ALF A. JORGENSON.